Figure 1:
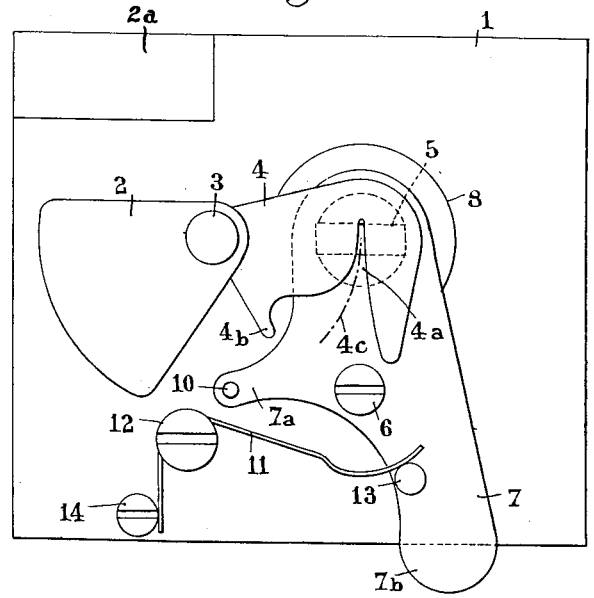

Oct. 9, 1962  P. ANGÉNIEUX  3,057,279
AUTOMATIC CONTROL DEVICE FOR LENS DIAPHRAGM
Filed April 17, 1959  2 Sheets-Sheet 1

Inventor
Pierre Angénieux
By Ernest F. Montagne
Attorney

United States Patent Office 3,057,279
Patented Oct. 9, 1962

3,057,279
AUTOMATIC CONTROL DEVICE FOR LENS DIAPHRAGM
Pierre Angénieux, Paris, France, assignor to Eastman Kodak Company, Flemington, N.J., a corporation of New Jersey
Filed Apr. 17, 1959, Ser. No. 807,161
Claims priority, application France May 7, 1958
2 Claims. (Cl. 95—64)

The present invention relates in general to control means for photographic camera diaphragms and has specific reference to a simplified device for automatically adjusting the opening of the diaphragm with a view to applying a constant illumination to the sensitive film of a photographic or motion picture camera disposed behind this lens, in spite of possible variations in the luminous intensity or candlepower of the light source employed.

This device is of the type comprising a photocell controlling, under the influence of the current generated by the light flux impinging thereon, the movable frame of a galvanometer having operatively connected thereto a suitably shaped blade masking more or less the lens aperture according to the quantity of light received by the photocell.

In devices of this type it has already been proposed to use a single blade solid with the movable frame of the galvanometer and formed with a constant-width slot on which a photometric wedge is secured so as to cover it completely. However, a known inconvenience of this arrangement is that the lens constantly operates under full-opening conditions and therefore the user cannot benefit of the advantages such as sharpness of image and field depth which are obtained when using a small aperture under usual conditions of use.

If a blade formed with a slot of variable width were substituted for a photometric wedge in combination with a blade formed with a constant-width aperture or slot this variable width may be so narrow at one end of the slot that at small opening values it becomes the cause of disturbance as far as the quality of the image is concerned, due to the diffraction effect thus produced.

Devices have also been proposed which comprise two movable blades each formed with a slot of variable width and so controlled that the axes of the two slots intersect each other for example at right angles, these blades being actuated either by a pair of galvanometers or by a single galvanometer, the two blades being in this last instance operatively interconnected through a mechanical device. In this case, the inconveniences set forth hereabove are avoided but at the cost of an undesirable complexity.

Now it is an essential object of the present invention to simplify the arrangement of the type broadly set forth hereinabove. It is another object of the present invention to provide an automatic control device for a lens diaphragm which comprises a single blade solid with the movable frame of a galvanometer and formed with a variable-width slot, the blade being displaceable in front of a fixed gate of elongated, for example, rectangular shape, interposed in the path of the light flux to the lens, the gate and slot having such relative positions that the passage area for the light beam afforded by the aperture resulting from the combination of these two elements is constantly limited in one direction either by the two longitudinal edges of the fixed gate, or by one of these longitudinal edges and the bottom of the slot, irrespective of the position of the variable-width slot limiting the light beam in a direction substantially at right angles to the one direction.

Figure 2:
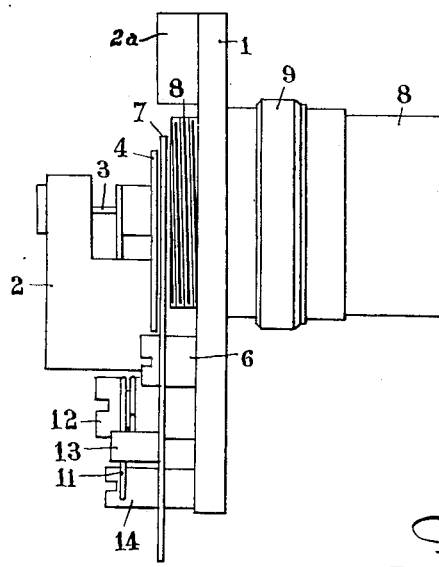
Figure 3:
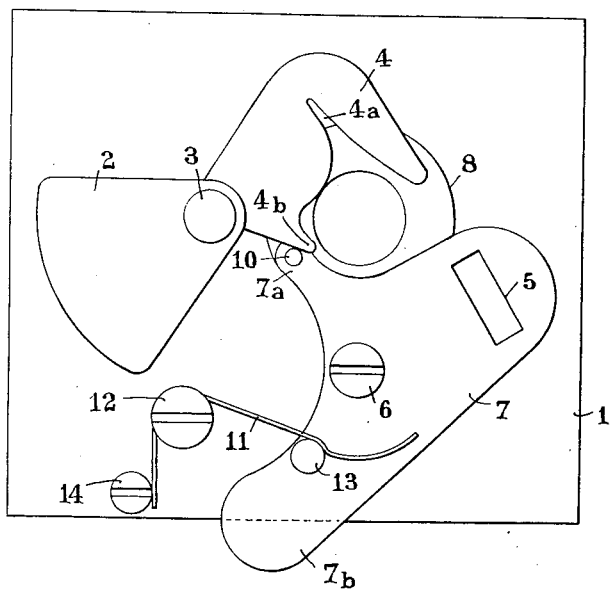
Figure 4:
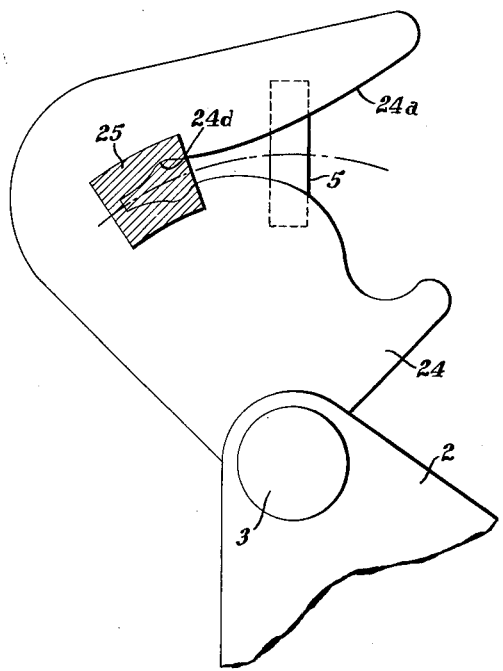

With these and other objects in view which will become apparent in the following detailed description the present invention will be clearly understood in connection with the accompanying drawings, in which:

FIGURE 1 is a front elevation of the automatic control device of the present invention;
FIGURE 2 is a side elevation thereof;
FIGURE 3 is a view similar to that of FIG. 1 disclosing the device in its inoperative position; and
FIGURE 4 is a front elevation disclosing an embodiment of the movable blade.

Referring now to the drawings and in particular to FIG. 1 the automatic control device comprises a supporting plate 1 secured to the mounting of the lens 8; and a galvanometer 2 (shown only diagrammatically) comprising a pivot pin 3 carrying the movable member to which the blade 4 of the device is rigidly secured. The blade 4 is pressed from an adequate opaque sheet material and formed with a slot 4a of gradually increasing width, as shown in FIG. 1, where the blade 4 is in its minimum-opening position. Driven by the movable member of the galvanometer 2 responsive in turn to the current generated by the photocell 2a under the influence of the light impinging thereon, the blade 4 is displaceable in front of a rectangular aperture or gate 5 disposed in front of the lens 8 and formed in a shutter 7 pivoted on a pin 6 secured to the plate 1. The shape of this aperture or gate 5, which is rectangular, but generally elongated with the major axis intersecting substantially at right angles the circular axis 4c of the slot 4a, is an essential feature of the present invention because, in comparison with the circular aperture utilized in known devices, it will increase appreciably the width of the slot 4a at small-opening values, thus avoiding to a certain extent the drawback set forth hereinabove characterizing extremely narrow slots.

Of course, due to the elongated shape of the gate 5, only one portion of the total lens aperture can be used, but, according to another feature of the present invention, the present device is adapted to be readily retracted to permit the optional use of a complementary diaphragm controlled by a ring 9, when it is desired to provide a larger passage area for the light beam or disconnect the automatic control device. In this case the component elements of the device are moved from the positions in which they are shown in FIG. 1, to those which are shown in FIG. 3.

To this end, the movable blade 4 is formed at its lower portion with a projection 4b engageable by a stud 10 carried by an arm 7a rigid with the shutter 7, when the latter is pivoted about its pin 6 to the position illustrated in FIG. 3. Thus, during this movement, the blade 4 will be moved away from the pivot pin 6 to the position shown in FIG. 3. The movable blade 4, and the shutter 7 are held in their end positions (FIG. 3) by a hairpin spring 11 wound on a pin 12 which is screwed to the plate 1; the spring 11 bears with one end against a pin 14 also screwed to the plate 1 and has its other end formed with a curved portion engaging a pin 13 carried by the lower portion 7b of the shutter 7. Provided that the members 4 and 7 resume the positions in which they are shown in FIG. 3 and that the movable member of the galvanometer 2 is provided with a suitable scale disposed in a visible location, it is evident that useful data for the manual adjustment of the additional stop may be derived from the photocell.

The reverse procedure by which the automatic control device may be restored to its operative position will be readily understood from a comparison of FIGS. 1 and 3 of the drawings.

In the embodiment illustrated in FIG. 4 the narrowest portion of the slot 24a formed in the movable blade 24 carries a neutral screen 25 secured thereacross on its edges. The screen 25 has a constant coefficient of absorption, and in addition the slot 24a comprises a widened portion 24d in the zone where the neutral screen 25 starts to become effective. Then the slot 24a becomes again gradually narrower toward its bottom, in order to combine the absorption of the neutral screen 25 with that of the throttling of the light beams, which results from the gradual reduction in the slot width in order to ensure the transmission of the proper light flux.

Of course, the embodiment illustrated and described herein should not be construed as limiting the field of the present invention as it merely constitutes an example to which many modifications and alterations may be brought without departing from the spirit and scope of the present invention as will readily occur to anybody conversant with the art. Thus, the gate and/or slot may be located in front of, behind or between, the objective-forming lenses, these two elements being separated if desired by one or more lenses.

Besides, the practical applications of the device of the present invention are not limited to the lens of photographic or motion-picture cameras. As a rule, the device of the present invention may be used for automatically maintaining to a constant value the illumination of any surface.

What I claim is:

1. A device for automatically controlling the cross-section of the passage of the light-rays in a photographic camera lens, comprising a photocell, generating electric current under the influence of the luminous flux directed into said photocell, a galvanometer having a movable member, the latter rotating under the influence of said electric current, a blade solid with said movable member and formed with a variable-width slot, as well as displaceable with said movable member, a plate interposed in the path of said light-rays and formed with an aperture of such a shape that predetermined edges thereof encroach on the passage of said light-rays in a direction corresponding to the axis of said slot of said blade, so that the open cross-section free for the passage of said light-rays is always limited by the edges of said variable-width slot of said blade together with at least one of said edges of the aperture of said plate extending between the edges of said variable-width slot, one portion of the latter, disposed in the zone thereof corresponding to its end of smallest width, being widened and having a width decreasing gradually in the direction toward said end, and a neutral screen of a constant coefficient of light absorption covering said widened portion of said variable-width slot.

2. A device for automatically controlling the cross-section of the passage of the light-rays in a photographic camera lens, comprising a photocell generating electric current under the influence of the luminous flux directed into said photocell, a galvanometer having a movable member, the latter rotating under the influence of said electric current, a blade solid with said movable member and formed with a variable-width slot, as well as displaceable with said movable member, a plate interposed in the path of said light-rays and formed with an elongated aperture, predetermined edges thereof encroaching on the passage of said light-rays in a direction corresponding to the axis of said slot of said blade, so that the open cross-section free for the passage of said light-rays is always limited by the edges of said variable-width slot of said blade together with at least one of said edges of the aperture of said plate extending between the edges of said variable-width slot, one portion of the latter, disposed in the zone thereof corresponding to its end of smallest width, being widened and having a width decreasing gradually in the direction toward said end, and a neutral screen of a constant coefficient of light absorption covering said widened portion of said variable-width slot.

References Cited in the file of this patent

UNITED STATES PATENTS

| 443,386 | Bigelow | Dec. 23, 1890 |
| 483,135 | Bullard | Sept. 27, 1892 |
| 1,392,876 | Leonard | Oct. 4, 1921 |
| 2,163,737 | Prinsen | June 27, 1939 |
| 2,421,499 | Guedon | June 3, 1947 |
| 2,841,064 | Bagby et al. | July 1, 1958 |
| 2,887,028 | Eburn | May 19, 1959 |

FOREIGN PATENTS

| 985,935 | France | Mar. 21, 1951 |